United States Patent
Ikeda

(10) Patent No.: US 7,317,930 B2
(45) Date of Patent: Jan. 8, 2008

(54) WIRELESS TRANSMISSION/RECEPTION SYSTEM

(75) Inventor: Yasunari Ikeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 496 days.

(21) Appl. No.: 11/057,243

(22) Filed: Feb. 14, 2005

(65) Prior Publication Data
US 2005/0198672 A1 Sep. 8, 2005

(30) Foreign Application Priority Data
Feb. 16, 2004 (JP) ............................. 2004-037971

(51) Int. Cl.
*H04B 7/00* (2006.01)
*H04N 7/20* (2006.01)
*H04B 7/24* (2006.01)

(52) U.S. Cl. ........................... 455/500; 455/39; 725/62

(58) Field of Classification Search ............. 455/426.2, 455/39, 42, 500, 502, 526, 69, 70, 7; 725/62, 725/81, 123, 131
See application file for complete search history.

(56) References Cited

U.S. PATENT DOCUMENTS

| | | | |
|---|---|---|---|
| 5,243,415 A | * | 9/1993 | Vance ......................... 725/81 |
| 5,613,190 A | * | 3/1997 | Hylton ......................... 725/81 |
| 5,613,191 A | * | 3/1997 | Hylton et al. .................. 725/81 |
| 7,020,121 B2 | * | 3/2006 | Hardacker et al. .......... 370/338 |
| 2004/0015990 A1 | * | 1/2004 | Suematsu et al. ............. 725/62 |
| 2005/0085197 A1 | * | 4/2005 | Laroia et al. ............... 455/101 |
| 2006/0288375 A1 | * | 12/2006 | Ortiz et al. .................. 725/62 |

FOREIGN PATENT DOCUMENTS

| | | |
|---|---|---|
| JP | 7 283801 | 10/1995 |
| JP | 7 283806 | 10/1995 |
| JP | 2000 49744 | 2/2000 |
| WO | WO 02 49385 | 6/2002 |

* cited by examiner

*Primary Examiner*—Sonny Trinh
(74) *Attorney, Agent, or Firm*—Frommer Lawrence & Haug LLP; William S. Frommer

(57) ABSTRACT

A wireless transmission/reception system is provided which can use a limited frequency band most effectively and operates flexibly. A receiver (wireless receiver) has a transmission processing unit for transmitting a control signal, which defines a wireless frequency band and a transmission frequency for each of wireless transmission signals, to a plurality of cameras (wireless transmitter) #C1 to #C5, and the cameras have reception processing units for receiving the controls signal. Each of the cameras can change the frequency band and a center frequency of the wireless transmission signal according to the input control signal. As a result, output channels (Ch1 to Ch5) of the receiver can be changed to a broadband channel or a narrowband channel arbitrarily.

5 Claims, 10 Drawing Sheets

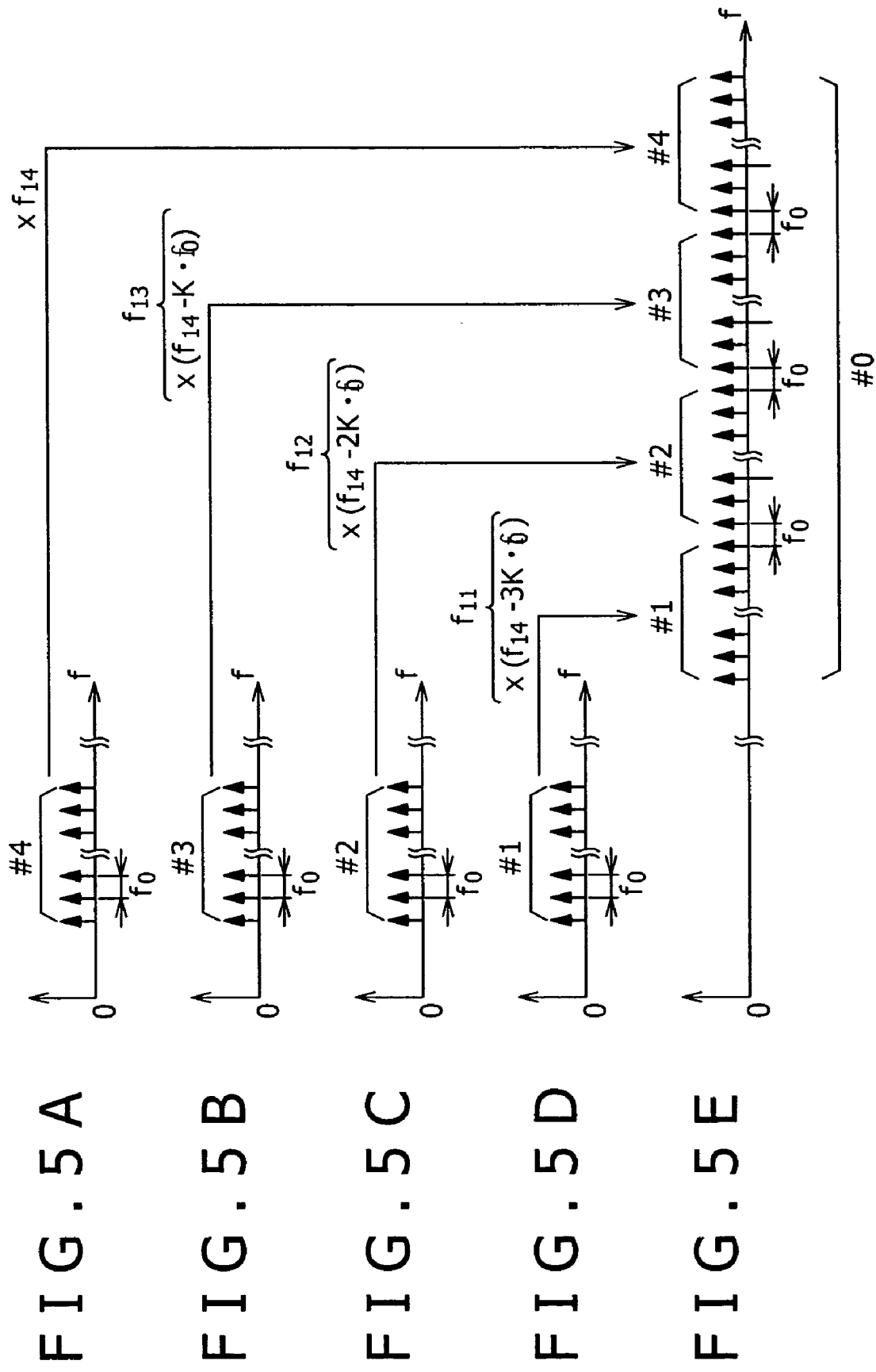

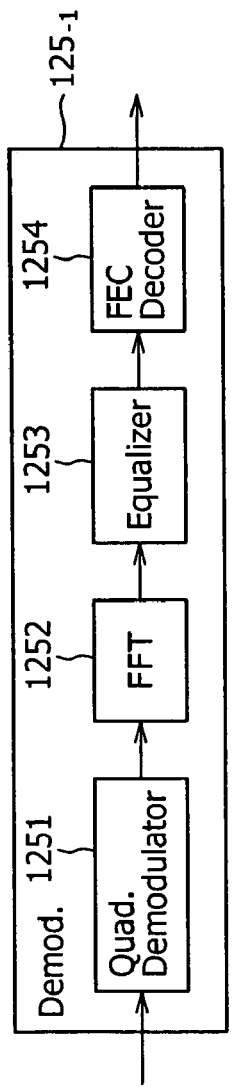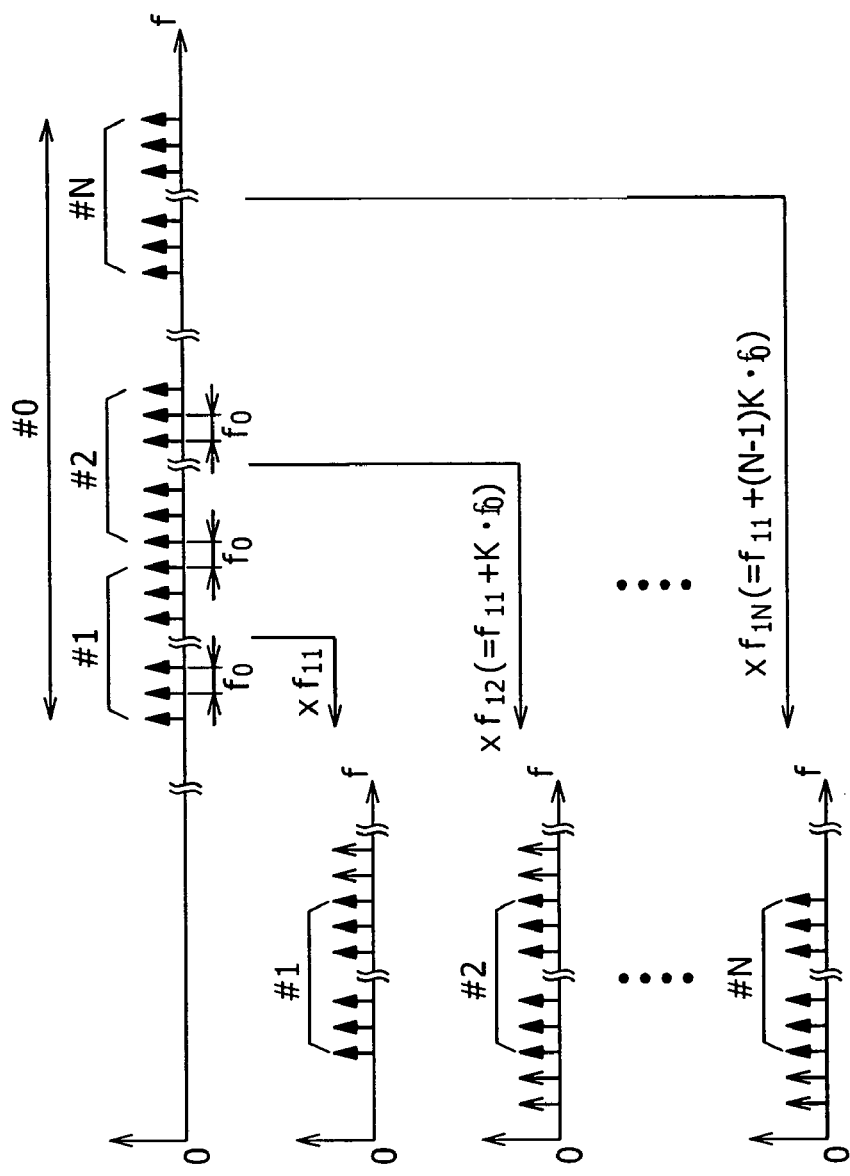
FIG. 8
FIG. 9A
FIG. 9B
FIG. 9C
FIG. 9D

WIRELESS TRANSMISSION/RECEPTION SYSTEM

CROSS REFERENCE TO RELATED APPLICATIONS

The present document is based on Japanese Priority Document JP2004-037971, filed in the Japanese Patent Office on Feb. 16, 2004, the entire contents of which being incorporated herein by reference.

BACKGROUND OF THE INVENTION

1. Field of the Invention

The present invention relates to a wireless transmission/reception system capable of receiving wireless transmission signals from a plurality of wireless transmitters at the same time and recovering an information code series of each wireless transmitter through demodulation, the information code series being generated at each wireless transmitter through modulation.

2. Description of Related Art

A wireless transmission system is known in which a flow (stream) of information of integrated moving images and audio signals capable of being reproduced synchronously is transmitted via radio waves. As a typical wireless transmission system, a wireless camera for shooting and transmitting live scenes of sports, events or the like to a receiver at a base station and a program distribution system which transmits via a wireless LAN have already been realized. A wireless camera is high in mobility due to cordless and is suitable for a sub-camera or news reporting equipment moving in a broad area. To deal with recent digitalization of broadcasting, the transmitting system for transmitting from a wireless camera to a base station is shifting from a conventional system adopting analog modulation as a transmission system to a new system adopting digital modulation. Such a recent digitalization of wireless transmission system allows error correction technologies to be adopted, and greatly contributes to versatility of multimedia information sources having a strong resistance against errors on a transmission path and a stable transmission quality.

A Standard Definition Television (SDTV) system is widely used even in present days as a standard television system, which uses 525 scan lines in Japan and North America and 625 lines in Europe. However, recent digitalization of broadcasting requests for high image quality and large screen in displaying visual information, and a program is requested to be compatible with High Definition Television (HDTV). A transmission/reception system using a wireless camera is therefore expected to be compatible with HDTV.

The present inventor has proposed a data transmission system which can transmit high density information in conformity with HDTV specifications or the like even via a wireless transmission path having an arrow frequency band, without lowering a bit rate (refer to patent document 1: Japanese Patent Application Publication No. 2002-344965). A transmitter of the data transmission system described in patent document 1 divides an information code series (transport stream (TS)) in conformity with, for example, Moving Picture Experts Group (MPEG) 2-TS, in the unit of TS packet to form a plurality of divided transport streams. Each divided transport stream is expanded in time and modulated through Orthogonal Frequency Division Multiplexing (OFDM) and thereafter sent at the same time to different wireless transmission paths via different transmission units (high frequency amplifiers and transmission antennas). In correspondence to this, a receiver side prepares a number of reception units (high frequency amplifiers and frequency converter circuits) and receives separately information (divided transport streams) sent via different wireless transmission paths. At each reception channel, data of a received signal is OFDM-demodulated, and the transport stream having the original high bit rate is reproduced by executing time compression and multiplexing in a packet synchronization state.

In a present on-scene site such as live broadcasting and coverage/reporting on the spot, it is important to effectively use some use-permitted frequency bandwidth as much as possible. A specific operation example is given herein. If the number of necessary wireless cameras is determined already which are used for live broadcasting relaying of sports, events or large scale news sites and if all cameras are assigned to HDTV, a frequency bandwidth allocated to each wireless camera becomes narrow because of a limit in a usable frequency band, and the image quality is therefore lowered because of a small amount of information of a signal transmitted from each wireless camera. Conversely, if the image quality is to be retained, the number of wireless cameras usable in the limited frequency band becomes small and video and audio information necessary for producing a program cannot be collected sufficiently. The following operation setting may be used. Of several wireless cameras, about one or two HDTV cameras are allocated to the site where a main angle having a relatively long broadcasting time is shot. An video image shot at a special angle and at a special site, which is supposed to have a sporadic and short broadcasting time and often broadcast in a small screen, has a low priority order. Accordingly, it is conceivable that SDTV cameras are assigned to the low priority order shooting. For example, in sports live broadcasting, a live sport video has a high priority order, and a video of an announcer, a commentator, or a state of audience has a low priority order. At an on-scene site of live broadcasting and coverage, however, there is a possibility, for example, that a failed HDTV camera is replaced with a reserved SDTV camera or that a allocated position for an SDTV camera is changed to a site to be broadcast as a main video, because of an accidental event. There is also a case in which an HDTV camera and an SDTV camera are desired to be used swichably because of a request from program production.

In such cases, since the usable frequency band is fixed for HDTV cameras and SDTV cameras presently used, a change in a transmission rate in accordance with a state change during the operation described above, cannot be dealt with flexibly. From this reason, there is a high possibility of an improper screen quality for broadcasting images and program production, such as the case that a video with rough images in conformity with the SDTV specifications are forced to be broadcast for a long period irrespective of HDTV broadcasting or conversely the case that a video with high definition images in conformity with the HDTV specifications are used for a small screen display.

If the transmission technologies described in the above-cited Patent Document 1 are applied to wireless cameras, a broadband signal output from an HDTV camera can be transmitted by dividing it into narrowband channels similar to for an SDTV camera. It is therefore advantageous in that a high quality image can be transmitted at a high bit rate even if the frequency band is relatively narrow. However, since the number of wireless transmission paths (transmission channels) increases, a requisite for a wide frequency bandwidth still remains as a whole. Although the transmitter described in Patent Document 1 is structured by considering transmission of a high transmission rate signal such as an HDTV signal, it is not considered at all to output a relatively low transmission rate signal such as an SDTV signal from its receiver. Therefore, the transmitter described in Patent Document 1 cannot be used as a receiver of the above-described wireless transmission/reception system capable of flexible operation, although it can be used as a wireless transmitter dedicated to HDTV.

SUMMARY OF THE INVENTION

A wireless receiver used to date is a wireless camera specific to each image specification, such as an HDTV camera and an SDTV camera. Compatibility with a conventional SDTV compatible system is not considered for the HDTV camera among others, from the viewpoint of effective use of a frequency band. Accordingly the HDTV camera is not suitable for an actual operation site in which there are used a plurality type of transmitters having different frequency bands of transmission signals.

The present invention therefore provides a wireless transmission/reception system which can use a limited frequency band most effectively and flexibly assign a wireless transmitter to an output channel of a receiver.

A wireless transmission/reception system according to the present invention includes: a plurality of wireless transmitters each for generating an information code series from an input signal, modulating a carrier wave in accordance with the information code series, and transmitting the modulated wave as a wireless transmission signal from a transmission unit; and a wireless receiver each for receiving and demodulating a plurality of wireless transmission signals transmitted from the plurality of wireless transmitters, and extracting the information code series corresponding to each of the wireless transmitters; wherein the wireless receiver includes a control circuit for generating a control signal which assigns each wireless transmission signal with a wireless frequency band and a transmission frequency, and a transmission processing unit for transmitting the control signal to each wireless transmitter; and each of the plurality of wireless transmitters includes a reception processing unit for executing and is configured to be able to change a wireless frequency band and a transmission frequency of a wireless transmission signal to be transmitted in accordance with the received control signal.

According to the present invention, preferably each of the plurality of wireless transmission signals is an OFDM modulated using OFDM, and with the control signal, each wireless frequency band of each of the plurality of wireless transmission signals is defined in the unit of a unit sub-carrier wave group constituted of a plurality of OFDM unit sub-carrier waves having a constant frequency interval and each transmission frequency of the plurality of wireless transmission signals is defined so that all of unit sub-carrier wave groups of the plurality of wireless transmission signals form one OFDM modulation signal.

In this case, preferably the wireless receiver transmits the control signal generated by the control circuit for independently changing a transmission rate of the information code series generated by each of the plurality of wireless transmitters, and the plurality of wireless transmitters change the number of unit sub-carrier wave groups constituting the wireless transmission signal to be transmitted, in accordance with the changed transmission rate. Alternatively, preferably the wireless receiver has a plurality of demodulation processing units provided for each of a plurality of output channels, the plurality of demodulation processing units receive one OFDM modulation signal sent from the plurality of wireless transmitters, execute quadrature modulation of the unit sub-carrier wave group in a particular frequency band and extract the information code series generated by any one of the plurality of wireless transmitted; wherein each of the plurality of demodulation processing units changes the particular frequency band and its center frequency of the unit sub-carrier wave group to be subjected to quadrature demodulation, in accordance with the control signal to thereby change a correspondence between the information code series to be output to a corresponding output channel and the wireless transmitter.

In the wireless transmission/reception system constructed as above, as the wireless receiver receives a plurality of wireless transmission signals from a plurality of wireless transmitters, each of the plurality of reception processing units executes frequency band separation and executes modulation after frequency conversion. Since the correspondence between each output channel of each reception processing unit and the wireless transmitter is predetermined, each output channel outputs the information code series (transport stream) modulated by the wireless transmitter identified by the correspondence. In channel arrangement for the information amount and channel assignment of a plurality of transport streams, the control circuit generates a control signal for the channel arrangement, and the control signal is passed to a transmission processing unit and transmitted to the plurality of wireless transmitters. Each wireless transmitter processes the received control signal at a reception processing unit, and changes the frequency band and transmission frequency of a wireless transmission signal defined by the control signal by changing, for example, a transmission rate and a local oscillation frequency for frequency conversion. The wireless transmission signal changed in this manner is transmitted to the wireless receiver from each wireless transmitter at the same time. The wireless receiver received a plurality of wireless transmission signals executes frequency band separation, frequency conversion and synthesis similar to those described above. Among others, with the stop control of a local oscillation signal from the local oscillator circuit to be executed by the control signal, the frequency band to be subjected to frequency conversion by each reception processing unit is predetermined. Therefore, by integrating converted frequency bands as necessary, the plurality of reception processing units output a transport stream whose frequency assignment of broadcast video channels is rearranged.

In the wireless transmitter of the present invention, the frequency band and central frequency of a wireless transmission signal on the side of the wireless transmitter are determined in accordance with control information output from the control circuit. Therefore, even if wireless transmission signals are received from a plurality of wireless transmitters at the same time, a proper reception process can be executed by referring to the control information which is generated on the reception side. It is therefore possible to obtain the information code series (transport stream) from a desired wireless transmitter from the output channel of each demodulation processing unit, as intended by the control signal. By changing the control signal, the correspondence between an output channel and a wireless transmitter can be changed as desired, and the frequency bandwidth and transmission frequency of a wireless transmission signal can be changed as desired. Consequently, a flexible camera operation and the like can be realized in which the input source (wireless transmitter) and output destination (monitor or the like) of broadband and narrowband channels can be changed as desired in accordance with imaging situations.

BRIEF DESCRIPTION OF THE DRAWINGS

FIGS. 5A to 5E are schematic diagrams illustrating synthesis of frequency bands;

FIG. 8 is a block diagram showing the structure of a demodulating processing circuit according to the embodiment.

FIGS. 9A to 9D are schematic diagrams illustrating frequency band separation and frequency conversion;

DESCRIPTION OF THE PREFERRED EMBODIMENTS

With reference to the accompanying drawings, description will be made on an embodiment of the present invention, by taking as an example a wireless transmission/reception system having wireless cameras (transmitters) and a base station (receiver) in which an information code series (stream) obtained by integrating video and audio data is processed by dividing it into N wireless sub-channels at the maximum (e.g., N=4). This wireless transmission/reception system adopts a transport stream (TS) specification defined as a multiplexing method of MPEG2 systems, for a wireless transmission signal to be sent from a wireless camera to a base station, and also adopts an Orthogonal Frequency Division Multiplexing (OFDM) modulation system. As compared to transmitting analog video shot, digital transport streams of video shot can transmit video and audio data at a less lowered S/N ratio and with a high quality. The OFDM modulation system degrades less the image quality which is otherwise degraded by a change in an electric field intensity during mobile reception and has less influence of multi-path interference. It is therefore possible to transmit high quality video and audio data by adopting the OFDM modulation system.

Figure 1:
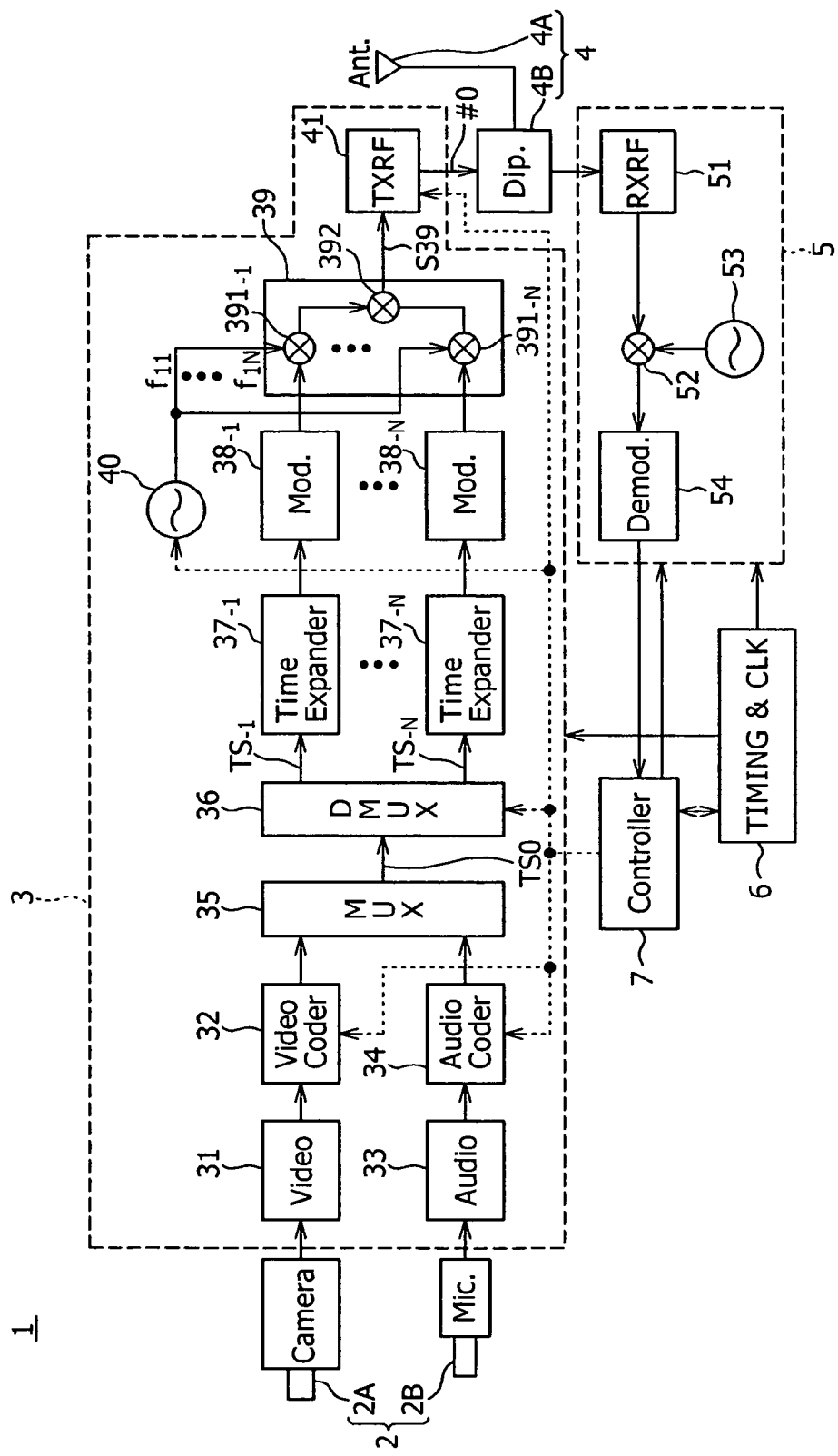
FIG. 1 is a block diagram showing the structure of a wireless camera as a receiver according to an embodiment.

FIG. 1 shows the structure of a wireless camera 1 as a transmitter. The wireless camera 1 has as main parts: an information acquisition unit 2 including an imaging device (Camera) 2A and a microphone (Mic.) 2B; a transmission processing unit 3 for performing generation, modulation and the like of an information code series (transport stream) integrating video and audio data; a transceiver unit 4 having the functions of a "transmission unit" and a "reception unit"; a reception processing unit 5 for performing a reception process of a control signal input from the transceiver unit 4; a circuit unit (TIMING & CLK) 6 for generating various clock signals and timing control signals; and a control unit (Controller) 7 for controlling these units.

The transmission processing unit 3 has: a video processing circuit (Video) 31; a video coding circuit (Video Coder) 32, an audio processing circuit (Audio) 33; an audio coding circuit (Audio Coder) 34; a multiplexing circuit (MUX) 35; a demultiplexing circuit (DMUX) 36 as a "division circuit"; time expansion circuits (Time Expanders) $37_{-1}$ to $37_{-N}$ where N is the same number as a maximum division number N of the division circuit 36; modulation processing circuits (Mod.) $38_{-1}$ to $38_{-N}$ where N is the same number as the maximum division number N; a band integrating circuit 39; a transmission local oscillator circuit 40; and a transmission high frequency circuit (TXRF) 41 as a "high frequency circuit" of the present invention.

The video processing circuit 31 performs various property corrections and conversions (including AD conversion) for an imaging signal sent from the imaging device 2A. The video coding circuit performs high efficiency compressing encoding (so-called information source encoding) defined by the MPEG2-TS specification, for a digital video signal from the video processing circuit 31. Similarly, the audio processing circuit 33 performs a predetermined audio process for an audio signal collected by the microphone 2B, and the audio coding circuit 34 performs the high efficiency compressing encoding process for the digital signal subjected to the audio process. The multiplexing circuit 35 time divisionally multiplexes an encoded video signal and an encoded audio signal by a method defined by the MPEG2-TS specification to convert them into a integrated information code series TS0, so-called transport stream, capable of being synchronously reproduced at a multimedia apparatus.

The division circuit 36 is a demultiplexing circuit for receiving a transport stream TS0, sequentially dividing it into N streams at the maximum in the TS packet unit (i.e., time divisionally) and distributing them to N output channels. The time expanding circuits $37_{-1}$ to $37_{-N}$ provided for the respective output channels of the division circuit 36 receive any one of divided transport streams $TS_{-1}$ to $TS_{-N}$ and perform a time expansion process at the maximum multiplication N equal to the division number. In the following description it is assumed that the transport stream TS0 is divided at the maximum number N, unless otherwise specifically referred to.

Figure 2A:
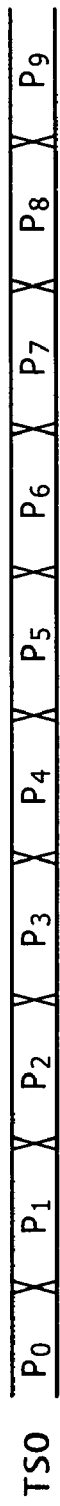
FIGS. 2A to 2E are timing charts showing an information code series in a TS packet unit, illustrating division and time expansion when the number of N output channels of a division circuit is 4.
Figure 2B:
Figure 2C:
Figure 2D:
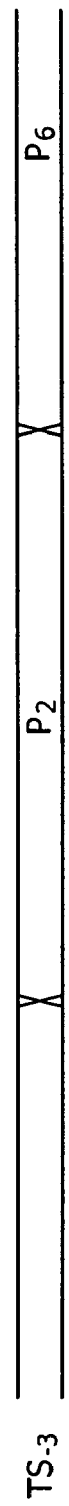
Figure 2E:

FIGS. 2A to 2E are timing charts of an information code series in the TS packet unit, illustrating division and time expansion when the number of N output channels of a division circuit 36 is 4. The multiplexing circuit 35 outputs a transport stream TS0 constituted of TS packets P0, P1, P2, . . . each having a 188-byte code and multiplexing encoded video and audio signals. FIG. 2A shows the transport stream TS0 output from the multiplexing circuit 35. As the transport stream TS0 is input to the division circuit 36, the division circuit 36 divides it in the TS packet unit and sequentially outputs and distributes the divided TS packets to the four channels. Although the details will be later given, the number of divided packets and the number of channels to be distributed can be changed as desired if they are equal to or smaller than the maximum number N. The time expanding circuits $37_{-1}$ to $37_{-N}$ perform a time expansion process for the TS packets divided and sent to the channels. In this case, the multiplication factor of time expansion is preferably equal to the division number N. In this example, since the division number N is 4, the TS packet output from the multiplexing circuit 35 is expanded by a fourfold in time. Therefore, dispersed TS packets after the division are coupled to form a transport stream which is an information code series. FIGS. 2B to 2E show transport streams $TS_{-1}$ to $TS_{-4}$ at respective channels formed by time expansion after the division. This process can be realized easily by mounting memories each having one packet capacity on the time expansion circuits $37_{-1}$ to $37_{-N}$. Read/write of this memory can be executed asynchronously and time expansion is performed at a read speed four times as slow as a write speed.

The transport streams $TS_{-1}$ to $TS_{-N}$ subjected to parallel time expansion processes are input to corresponding ones of the modulation processing circuits $38_{-1}$ to $38_{-N}$ which execute various processes necessary for transmission path encoding including OFDM modulation. The circuit structures of the modulation processing circuits $38_{-1}$ to $38_{-N}$ are common to each other.

Figure 3:
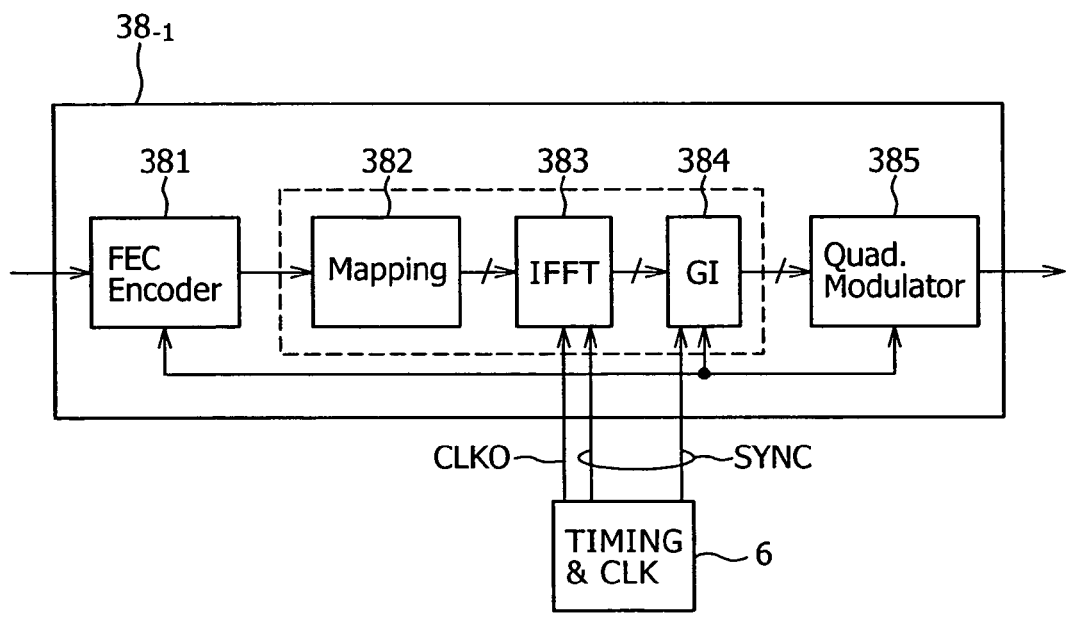
FIG. 3 is a block diagram showing the structure of a modulation processing circuit according to the embodiment.
Figure 4:
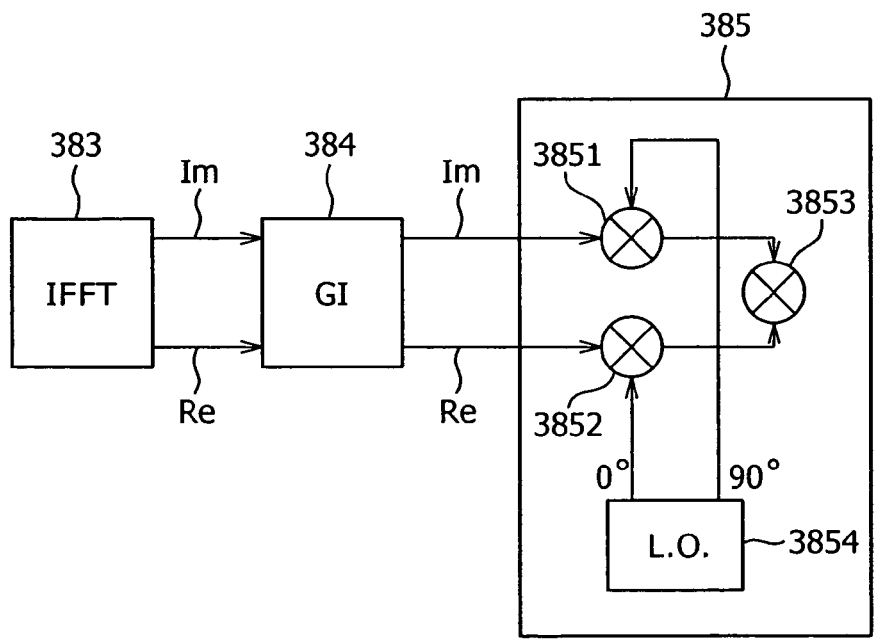
FIG. 4 is a block diagram showing the structure of a quadrature modulation unit of the modulation processing circuit according to the embodiment.

FIG. 3 shows the structure of the modulation processing circuit $38_{-I}$ (I=1 to N). The modulation processing circuit $38_{-I}$ has: a Forward Error Correction (FEC) encoding circuit (FEC Encoder) 381 for performing an FEC process; a signal point mapping circuit (Mapping) 382; an Inverse Fast Fourier Transform (IFFT) circuit 383; a Guard Interval (GI) adding circuit 384; and a Quadrature Modulator (Quad. Modulator) 385 as a "quadrature modulation unit". The structure of the quadrature modulation circuit 385 is shown in FIG. 4.

These circuits 381 to 385 are supplied with an operation clock CLK0 from the circuit unit (TIMING & CLK) 6 for generating various clocks shown in FIG. 1. The signal point mapping circuit 382, IFFT circuit 383 and guard interval adding circuit 384 are specifically called a "symbol generator unit" in the present invention. The circuit unit (TIMING & CLK) 6 for generating various clocks supplies the IFFT circuit 383 and guard interval adding circuit 384 among others of the symbol generator unit with a necessary sync signal SYNC. The N IFFT circuits 383 in the N modulation processing circuits $38_{-1}$ to $38_{-N}$ can therefore execute IFFT synchronously, and the N guard interval adding circuits 384 add the same guard interval at the same timing. Consequently, OFDM symbols can be generated in the N modulation processing circuits $38_{-1}$ to $38_{-N}$ at the same timing.

The operation of the modulation processing circuit 38-I will be described. The structure and operation of the reception system circuit (reception processing unit 5) will be described later.

First, the forward error correction encoding circuit 381 executes an error correction process and an interleave process as a transmission path encoding process. In the transmission path encoding, an error correction encoding is generally performed by using a concatenation code of a Read Solomon (RS) code and a convolution code. Convolution encoding is executed at an encoding factor of ½ resistant against a burst error, and encoding factors ¾ and ⅔ are generated in accordance with an optional rule of the standard. A convolution encodes signal is subjected to various interleaving processes in the symbol if necessary. An information code series after the transmission path encoding is sent to the signal point mapping circuit (Mapping) 382.

The signal point mapping circuit (Mapping) 382 executes a process of partitioning each TS packet data set of the input information code series into a predetermined bit unit and assigning each partitioned data set with a mapping point (a modulation symbol having information of phase and amplitude) of the rectangular coordinate system matching a predetermined carrier wave modulation system (e.g., 16 QAM modulation). In this manner, a modulation symbol is generated which is dependent on the carrier wave modulation system for an OFDM carrier wave.

The generated modulation symbol is a frequency domain symbol which is then subjected to IFFT by the IFFT circuit 383 to be converted into a time domain signal. An output of the IFFT circuit 383 is a complex time signal. Real number data Re is output from a real number output of the IFFT circuit 383, whereas imaginary number data Im is output from an imaginary number output.

The guard interval adding circuit (GI) 384 adds a guard interval in the predetermined bit unit to the information code series constituted of the real number data Re and imaginary number data Im. The guard interval is added by a process of copying a back porch of a predetermined unit from the information code series and inserting it to a front side. This process is executed by delay addition using a memory. This guard interval addition forms the OFDM symbol which is a unit information code series of OFDM modulation.

The quadrature modulation circuit 385 is a circuit for performing so-called OFDM modulation. The quadrature modulation circuit 385 quadrature-modulates the real number data Re and imaginary number data Im generated by the IFFT circuit 383 and added with the guard interval by the guard interval adding circuit 384.

To this end, the structure of the quadrature modulation circuit 385 is constituted of, as shown in FIG. 4, two multiplier circuits 3851 and 3852, an adder circuit 3853 and a local oscillator circuit 3854. The real number time signal output (real number data) Re and imaginary number time signal output (imaginary number data) Im generated by the IFFT circuit 383 are passed to the guard interval adding circuit 384 and supplied to the multiplier circuits 3852 and 3851, respectively. The local oscillator circuit 3854 oscillates at a fixed frequency and supplies two oscillation outputs having the phases of 0° and 90° to the multiplier circuits 3852 and 3851, respectively. Outputs of the two multiplier circuits 3852 and 3851 are integrated at the adder circuit 3853 which outputs the addition result as a quadrature modulation signal.

The band integrating circuit 39 shown in FIG. 1 integrates frequency bands of quadrature modulation signals (each being a group of K unit sub-carrier waves) sent from the N modulation processing circuits $38_{-1}$ to $38_{-N}$ to generate an OFDM modulation signal S39 in one frequency band equivalent to a signal obtained by modulating K×N OFDM carrier waves by the original information code series, i.e., the transport stream TS0 from the multiplexing circuit 35. As the structure for integrating the frequency bands, the band integrating circuit 39 has: N transmission frequency conversion circuits $391_{-1}$ to $391_{-N}$ each constituted of a mixer whose input of one side is connected to an output of a corresponding one of the modulation processing circuits $38_{-1}$ to $38_{-N}$; and a synthesizing circuit 392 constituted of an adder for adding the outputs of the transmission frequency conversion circuits $391_{-1}$ to $391_{-N}$. The transmission local oscillator circuits 40 are structured so that N transmission oscillation signals having different frequencies at a predetermined pitch can be supplied to inputs of the other side of the N transmission frequency conversion circuits $391_{-1}$ to $391_{-N}$. In the following, the frequency of the transmission oscillation signal supplied to the first transmission frequency conversion circuit $391_{-1}$ is represented by f11, the frequency of the transmission oscillation signal supplied to the second transmission frequency conversion circuit $391_{-2}$ (not shown) is represented by f12, . . . , and the frequency of the transmission oscillation signal supplied to the N transmission frequency conversion circuit $391_{-N}$ is represented by f1N.

The OFDM modulation signal S39 with the integrated frequency band is supplied to the next stage transmission high frequency circuit (TXRF) 41 whereat unnecessary noises such as harmonics are removed by a built-in low-pass filter if necessary, and amplified if necessary, and thereafter converted into a predetermined high frequency signal. This high frequency signal is passed to a diplexer (Dip.) 4B of the transmission/reception unit 4 and transmitted from an antenna (Ant.) 4A as a transmission signal #0 having one frequency band.

Figure 6A:
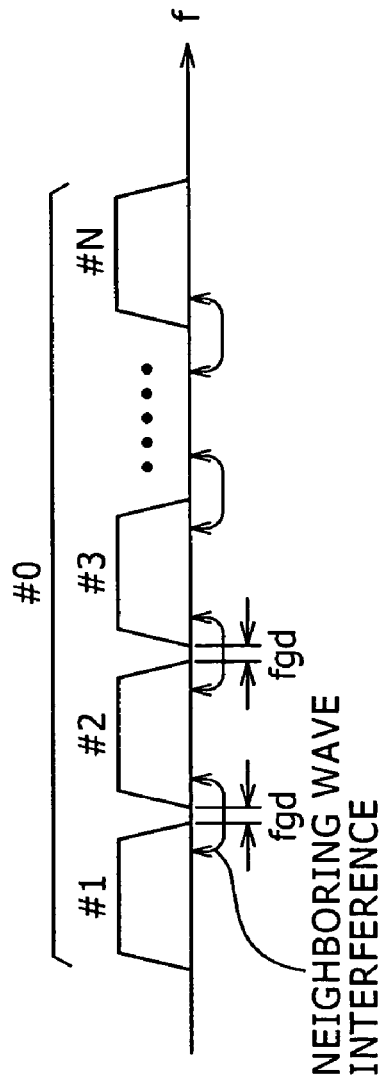
FIGS. 6A to 6C are diagrams showing transmission signals after the synthesis of frequency bands.
Figure 6B:
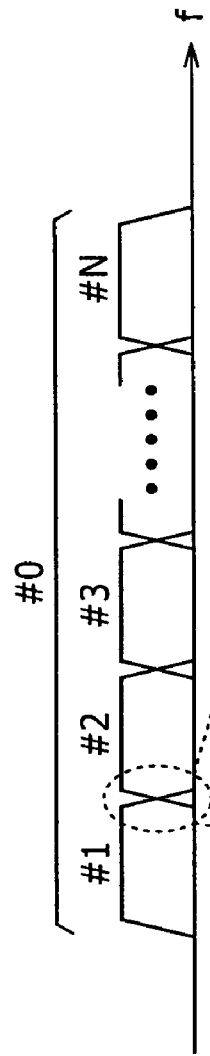
Figure 6C:
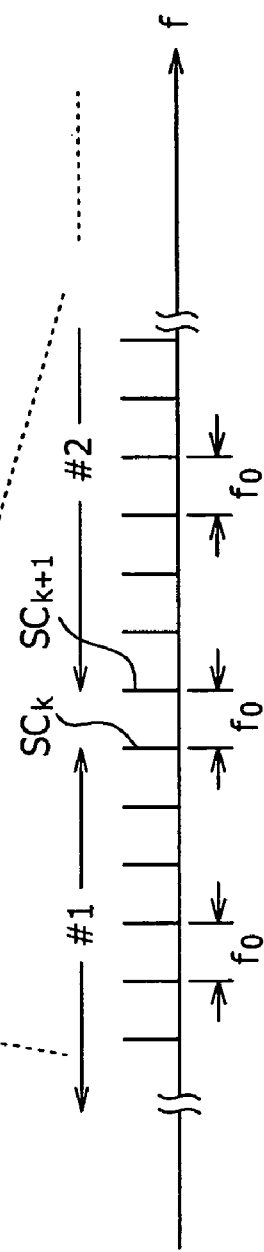

FIGS. 5A to 5E are schematic diagrams illustrating integrating frequency bands, and FIGS. 6A to 6C are diagrams showing a transmission signal #0 after integrating frequency bands. FIGS. 5A to 5D schematically show output signals #1, #2, #3, and #4 from the modulation processing circuits $38_{-1}$, $38_{-2}$, $38_{-3}$ and $38_{-4}$, with the abscissa representing a frequency. Each of the output signals #1, #2, #3, and #4 is an OFDM signal in an intermediate frequency band modulated to a signal constituted of a predetermined number of K unit sub-carrier waves having a constant frequency pitch of f0 and quadrature relation between neighboring waves. The OFDM signal of this type is generated under the conditions that the modulation processing circuits $38_{-1}$, $38_{-2}$, $38_{-3}$ and $38_{-4}$ have the same transmission path encoding parameter, i.e., the N forward error correction encoding circuits 381 have the same encoding factor and that the N interleave circuits have the same interleave parameter. It is also necessary that the N IFFT circuits 383 operate synchronously, the N guard interval adding circuits 384 add the guard interval of a constant length at the same timing in the symbol, and the symbols generated by the symbol generator units of a plurality of modulation processing circuits $38_{-1}$ to $38_{-N}$ have the same time length and synchronized output timings.

FIG. 5E schematically shows a transmission signal #0 formed by integrating the frequency bands of the OFDM signals #1 to #4 in the intermediate frequency band and shifting the frequency band to a transmission frequency band through high frequency conversion. Integrating the frequency bands is executed in the following manner. The above-described transmission frequency conversion circuits $391_{-1}$ to $391_{-N}$ mix the OFDM modulation signals in the intermediate frequency band from the modulation processing circuits $38_{-1}$, . . . , $38_{-4}$ with the oscillation signals from the local oscillator circuits 40 to convert the intermediate frequency band into the predetermined frequency band, and the signals subjected to the conversion are synthesized The oscillation frequencies f11 to f14 (refer to FIG. 1) which determine the predetermined frequency band are different for each of the transmission frequency conversion circuits $391_{-1}$ to $391_{-4}$. As shown in FIG. 5, assuming that the frequency f14 of the oscillation signal supplied to the fourth transmission conversion circuit 391-4 is the highest frequency, it is desired that the frequency f13 of the oscillation signal supplied to the third transmission conversion circuit $391_{-3}$ is set to f13=f14−K·f0, the frequency f12 of the oscillation signal supplied to the second transmission conversion circuit $391_{-2}$ is set to f12=f14−2K·f0, and the frequency f11 of the oscillation signal supplied to the first transmission conversion circuit $391_{-1}$ is set to f11=f14−3K·f0. In this case, the signals #1, #2, #3 and #4 from the transmission frequency conversion circuits $391_{-1}$ to $391_{-4}$ are juxtaposed to integrate the frequency bands and form one OFDM modulation signal #0 after high frequency conversion. In the following, the OFDM modulation signal #0 (a group of N unit sub-carrier waves) after the high frequency conversion is called a "wireless channel signal", its transmission frequency band is called a "wireless channel", the OFDM modulation signals #1 to #4 of each group of unit sub-carrier waves constituting a wireless channel signal are called "wireless sub-channel signals" and their transmission frequency bands are called "wireless sub-channels".

FIG. 6B schematically shows the wireless channel signal #0 formed by integrating the N wireless sub-channel signals #1, #2, #3, . . . , #N, with the abscissa representing a frequency f. A portion of FIG. 6B is enlarged and shown in FIG. 6C. In this example, the above-described conditions for the oscillation frequencies f11 to f14 are applied by expanding them to N oscillation frequencies. FIG. 6A shows the wireless channel signal #0 having guard bands between wireless channels. If there is a plurality of wireless channels and quadrature is not established between wireless channel signals, carrier wave interference becomes generally large between wireless channel signals. The wireless channel signal #0 shown in FIG. 6A has guard bands of a constant frequency band fgd between wireless sub-channel signals #1 and #2, #2 and #3, . . . in order to prevent carrier wave interference. In the present invention, however, the frequency band fgd is defined as a several times larger than the unit sub-carrier wave f0 so that interference wave will not influence each wireless channel signal.

In the wireless channel signal #0 shown in FIG. 6C, the interval, between the highest frequency unit sub-carrier wave SCk among the OFDM unit sub-carrier waves constituting the wireless sub-channel signal #1 in the lowest frequency band and the lowest frequency unit sub-carrier wave SCk+1 among the OFDM unit sub-carrier waves constituting the wireless sub-channel signal #2 next to the wireless sub-channel signal #1, is set equal to the interval f0 which is the interval between OFDM unit sub-carrier waves constituting each of the wireless sub-channel signals #1 to #4. The same setting is made between other wireless sub-channel signals #2 and #3, #3 and #4, . . . . By setting the wireless sub-channel interval equal to the unit sub-carrier wave interval f0, the wireless sub-channels can be arranged without any break and the band can be used effectively. Quadrature can also be retained between wireless sub-channel signals. It is therefore possible to retain the quadrature of the whole integrated wireless channel signal #0 and carrier wave interference between wireless sub-channel signals can be avoided. In this manner, the high frequency wireless channel signal #0 formed by integrating the frequency bands can establish the quadrature between sub-carrier waves, and can be processed later as one OFDM modulation signal. The wireless channel signal #0 shown in FIG. 6-A- is one type of the OFDM modulation signal because the quadrature is retained between unit sub-carrier waves. In order to properly arrange the wireless sub-channel signals #1 to #4 to form one integrated wireless channel signal #0, it is necessary to precisely set K·f0 as the frequency interval of local oscillation frequencies f11 to f1N supplied from the local oscillator circuits 40. This frequency control can be realized by using a frequency synthesizer as the local oscillator circuit 40, the frequency synthesizer operating by using as a reference a signal synchronized with a clock supplied from the circuit 6 for clock generation and the like.

In the example described above, the wireless camera transmits the control signal to the base station by using a diplexer and the same antenna. However, the antenna (transmission path) may be separated.

Next, the structure and operation of a receiver will be described.

Figure 7:
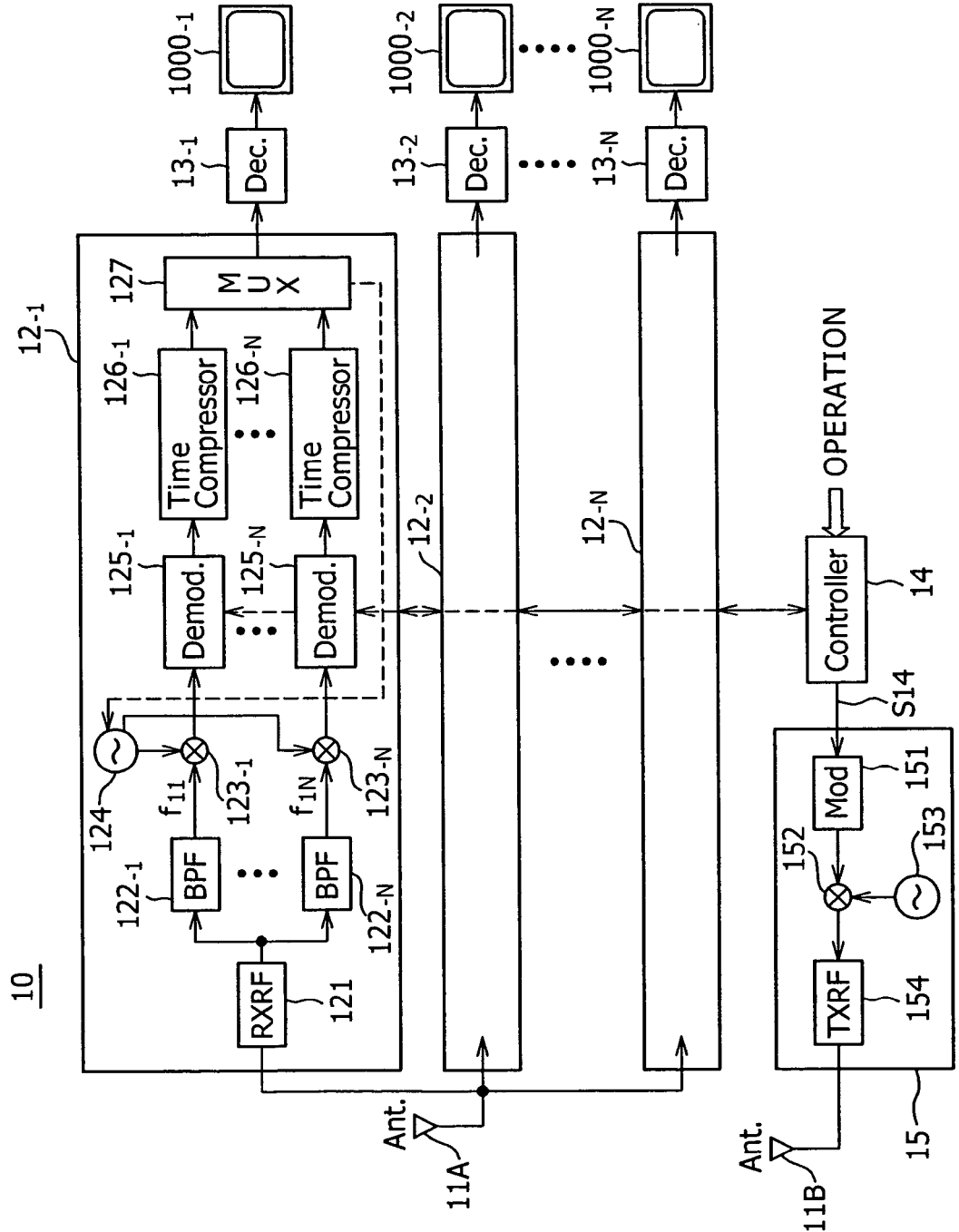
FIG. 7 is a block diagram showing the structure of a receiver according to the embodiment.

FIG. 7 shows the structure of a wireless receiver.

The wireless receiver 10 has a reception antenna (Ant.) 11A, N reception processing units $12_{-1}, 12_{-2}, \ldots, 12_{-N}$, N decoder circuits (Dec.) $13_{-1}, 13_{-2}, \ldots, 13_{-N}$ and a control circuit (Controller) 14 for controlling these elements and the whole receiver. In this example, the wireless receiver 10 is configured in order to match the maximum division number N on the transmission side. The number M ($\leq$N) of actually used parallel processing circuits is changed in correspondence with the operation on the transmission side. In the following, the maximum parallel processing circuits N are used by way of example.

Each of the reception processing units $12_{-1}, 12_{-2}, \ldots, 12_{-N}$ has: a reception high frequency circuit (RXRF) 121; N band-pass filter circuits (BPF) $122_{-1}, \ldots, 122_{-N}$ as "band separation circuits"; N frequency conversion circuits $122_{-1}, \ldots, 123_{-N}$; a local oscillator circuit 124; N OFDM demodulation circuits (Demod.) $125_{-1}, \ldots, 125_{-N}$ as "demodulation processing circuits"; N time compression circuits (Time Compressor) $126_{-1}, \ldots, 126_{-N}$; and a multiplexing circuit (MUX) 127 as a "synthesizer circuit" for synthesizing signals (information code series) after time compression.

FIG. 8 shows the structure of the demodulation processing circuit $125_{-I}$ (I=1 to N). The demodulation processing circuit $125_{-I}$ has a quadrature demodulation circuit (Quad. Modulator) 1251, a Fast Fourier Transform (FFT) circuit 1252, an equivalent circuit (Equalizer) 1253 and a Forward Error Correction (FEC) decoding circuit (FEC Decoder) 1254 for decoding the information code series subjected to FEC.

Next, the fundamental operation of the receiver will be described. A wireless channel signal received at the reception antenna 11A is input to the reception high frequency circuit 121 whereat it is subjected to a predetermined signal amplification and tuning process to be converted into a predetermined intermediate frequency. An output of the reception high frequency circuit 121 is divided into N series and input to the band separation circuits $122_{-1}, \ldots, 122_{-N}$. Each of the band separation circuits $122_{-1}, \ldots, 122_{-N}$ performs a predetermined band-pass filtering process to a wireless transmission signal to be input, respectively. The signal pass-bandwidth of each of the band separation circuits $122_{-1}, \ldots, 122_{-N}$ is set K·f0. The constant K is the number of unit sub-carrier waves constituting each wireless sub-channel defined on the transmission side, and the frequency f0 is the frequency interval between unit sub-carrier waves. The signal pass-bandwidth of each of the band separation circuits $122_{-1}, \ldots, 122_{-N}$ is set differently in the unit of the signal pass-bandwidth K·f0. In this example, the pass-band of the band separation circuit $122_{-1}$ is lowest on the frequency axis, the pass-band of the band separation circuit $122_{-2}$ is next lowest, and the pass-band of the band separation circuit $122_{-N}$ is highest on the frequency axis. A plurality of signals (hereinafter called sub-channel signals) are output from the band separation circuits $122_{-1}, \ldots, 122_{-N}$, having predetermined different frequencies and a constant bandwidth K·f0.

Each sub-channel signal subjected to the pass-band filtering process and having the predetermined bandwidth is supplied to one input side of a corresponding one of the frequency conversion circuits $123_{-1}, \ldots, 123_{-N}$ connected to an output channel of a corresponding one of the band separation circuits. The other input side of the frequency conversion circuits $123_{-1}, \ldots, 123_{-N}$ is supplied with local oscillation signals at frequencies f11, f12, . . . , f1N from the local oscillator circuit 124. The frequencies f11, f12, . . . , f1N of N local oscillation signals are set to the same as those of the local oscillation signals used for integrating the frequency bands on the transmission side (refer to FIGS. 1 and 5). Each sub-channel signal is frequency-mixed with the local oscillation signal to be converted into a predetermined frequency.

The local oscillator circuit 124 is can be configured to control—to stop unnecessary local oscillation signals f11 to f1N under the control of the control circuit 14, to thereby prevent frequency conversion of unnecessary signals and noises. In the present invention, N wireless transmission signals at the maximum having different frequency bands can be received at the same time. In order to avoid interference, all the frequency conversion circuits $123_{-1}$ to $123_{-N}$ of the reception processing units $12_{-1}$ to $12_{-N}$ are controlled so as not to frequency-convert the sub-channel signal in the same frequency band duplicately in accordance with the control signals input from the control circuit 14. This control is executed by the control circuit 14 by instructing each reception processing unit to stop a particular local oscillation signal of the local oscillator circuit 124. Although a high frequency signal is output from the frequency conversion circuit stopped its frequency conversion, this unnecessary signal is removed by a later stage low-pass filter, which is not shown in the drawing.

With reference to FIGS. 9A to 9D, more detailed description will be made on the above-described band-pass filtering process and frequency band conversion. FIGS. 9A to 9D are schematic diagrams illustrating separation and conversion operations for pass-bands, with the abscissa representing a frequency f.

FIG. 9A shows a wireless channel signal #0 converted into an intermediated frequency by the reception high frequency circuit 121. The wireless channel signal #0 at the intermediate frequency is output from the transmitter 1 described earlier and is generated by integrating the frequency bands of N wireless sub-channel signals #1, #2, . . . , #N. As described earlier, the interval of K unit sub-carrier waves in each of the wireless sub-channel signals #1, #2, . . . , #N and the frequency interval between wireless sub-channel signals #1 and #2, #2 and #3, . . . are both f0. The wireless sub-channel signal #0 is an OFDM modulation signal constituted of K×N unit sub-carrier waves in total. The configuration shown in FIG. 9A shows the maximum number of frequency bands. The wireless receiver 10 can receive at the same time wireless channel signals constituted of wireless sub-channels of an optional number M ($\leq$N) not larger than N and not smaller than 1. However, Simultaneous reception assumes that any of N wireless sub-channel signals #1, #2, . . . , #N is not used in common in reception signals received at the same time. The details of the simultaneous reception and a change in channel use will be later given.

FIGS. 9B to 9D show sub-channel signals #1, #2, . . . , #N after frequency conversion. In order to re-arrange the frequencies of the sub-channel signals #1, #2, . . . , #N, it is necessary for the band separation circuits (band-pass filter circuits) $122_{-1}, \ldots, 122_{-N}$ to first perform frequency band separation. At the same time as the frequency band separation, aliasing by using images of N sub-channels and a sampling clock in later stage digital processing is suppressed. However, the sub-channel signals #1, #2, . . . , #N are arranged adjacently at the OFDM unit sub-carrier wave interval f0 so that it is difficult to steeply cut off adjacent OFDM sub-carrier waves of adjacent sub-channels by the pass-band filter circuits. Therefore, adjacent channel carrier wave components are left more or less in each sub-channel signal #1, #2, . . . , #N.

Next, the frequency conversion circuits $123_{-1}, 123_{-N}$ re-arrange the frequencies of the separated sub-channel signals #1, #2, . . . , #N. In this case, N local oscillation signals (frequencies: f11, f12, . . . , f1N) are used which have the frequency difference of K·f0, the product of the number of K unit sub-carrier waves of each OFDM sub-channel signal and the unit sub-carrier wave interval f0. For example, if the local oscillation frequency f11 is used for frequency conversion of the lowest frequency sub-channel signal #1, a local oscillation frequency of f12=f11+K·f0 is used for the second lowest frequency sub-channel signal #2, a local oscillation frequency of f13=f11+2K·f0 is used for the third lowest frequency sub-channel signal #3, . . . , and a local oscillation frequency of f1N=f11+(N−1) K·f0 is used for the highest frequency sub-channel signal #N.

In FIGS. 9B to 9D, each unit sub-carrier wave is indicated by a solid line arrow, and a unit sub-carrier wave of an adjacent sub-channel left and not removed by the band-pass filter during separation is indicated by a broken line arrow. When the sub-channel signals #1, #2, . . . , #N are converted into predetermined frequencies, the left unnecessary unit sub-carrier waves are also converted into predetermined frequencies, and, for example, left as shown in the drawings. More specifically, several remaining carrier waves are left at the interval of f0 from the high frequency side in the lowest frequency sub-channel signal #1, and conversely, several remaining carrier waves are left at the interval of f0 from the low frequency side in the highest frequency sub-channel signal #N. Several remaining carrier waves are left on both the high and low frequency sides in the intermediate sub-channel signals #2 to #(N−1). However, as described in the frequency band integration of the transmitter, the integrated sub-channel signals #1 to #N are arranged on both sides of each border between adjacent sub-channel signals, and two unit sub-carrier waves belonging to different sub-channels have the quadrature phases. Therefore, even if one of the two unit sub-carrier waves is a remaining carrier wave, this will not influence the other unit sub-carrier wave. From this reason, the wireless receiver 10 can use the band-pass filter as the band separation circuits $122_{-1}, \ldots, 122_{-N}$, and has the advantage that frequency band separation can be performed with a simple structure.

In the above manner, the frequencies of the unit sub-carrier waves of N sub-channel signals are arranged regularly, or the sub-channel signals are converted into baseband signals. Each of the sub-channel signals whose frequency bands have a regular low frequency level is output to a corresponding one of the demodulation processing circuits $125_{-1}, \ldots, 125_{-N}$.

Each of the demodulation processing circuits $125_{-1}, \ldots, 125_{-N}$ executes a predetermined demodulation process for an input sub-channel signal. As shown in FIG. 8, the sub-channel signal is first quadrature-demodulated by the quadrature demodulation circuit 1251 and converted into real number and imaginary number baseband signals. The quadrature demodulation circuit 1251 operates in response to a clock from a circuit unit (not shown) for generating an operation clock and the like, generates two oscillation signals having a phase difference of 90 degrees, and quadrature-modulates the sub-channel signal while the phase difference between tow signals is changed. This arrangement is common to all N quadrature demodulation circuits 1251 so that the quadrature parameter is also common to them.

After the real number and imaginary number time signals are AD-converted, they are supplied to a real number input part and an imaginary number input part of the FFT circuit 1252. The FFT circuit 1252 converts the input real number and imaginary number time signals, from the time domain signals to the frequency domain signals. In this case, although the sub-channel signal has a remaining unit sub-carrier wave of the adjacent sub-channel, this remaining unit sub-carrier wave will not interfere with the demodulation signal because the remaining unit sub-carrier wave of the adjacent sub-channel is quadrature relative to the sub-channel to be demodulated as described previously.

The sub-channel signal converted into the frequency domain by the FFT circuit 1252 is supplied to the equivalent circuit 1253 whereat the transmission path characteristics are equalized. This equivalent circuit 1253 is a circuit for correction the frequency characteristics changed by multi-path which is inevitable particularly for ground transmission, and has a function of estimating the transmission characteristics by referring to a known pilot signal inserted in the transmission signal and compensating for the transmission characteristics.

An output of the equivalent circuit 1253 is supplied to the forward error correction decoding circuit 1254 whereat various error correction processing is performed and an error-corrected sub-channel information code series is output from the demodulation processing circuit $125_{-I}$ to a corresponding one of the time compression circuits $126_{-1}, \ldots, 126_{-N}$ shown in FIG. 7.

The time compression circuits 126-1, . . . , 126-N execute a time compression process of compressing the time by an N-fold where N is the same as the sub-channel number (division number) N, for the input sub-channel information code series. The information code series after the time compression becomes an encoded series (transport stream) which is input to the next stage synthesizing circuit 127 whereat a synthesizing process is executed. In the following, transport streams of the sub-channels output from the time compression circuits $126_{-1}, \ldots, 126_{-N}$ are represented by $TS_{-1}, \ldots, TS_{-N}$ and the recovered transport stream after the synthesis is represented by TS0.

Figure 10A:
FIGS. 10A to 10C are timing charts of transport streams in a TS packet unit before time compression.
Figure 10B:
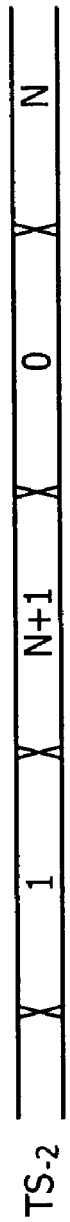
Figure 10C:
Figure 10D:
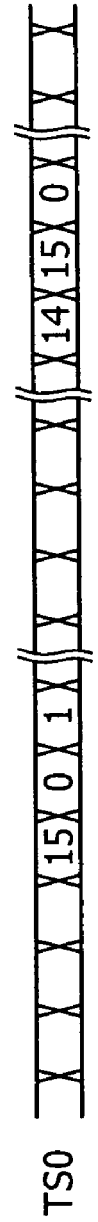
FIG. 10D is a timing chart of a transport steam TS0 in the TS packet unit formed through synthesis of transport streams after the time compression.

FIGS. 10A to 10C are timing charts of the transport streams $TS_{-1}, \ldots, TS_{-N}$ before time compression in the TS packet unit. FIG. 10D is a timing chart of the transport stream TS0 in the TS packet unit, the transport stream TS0 being formed by synthesizing the transport streams $TS_{-1}, \ldots, TS_{-N}$ after the time compression. The synthesizing circuit 127 is a multiplexing circuit for time sequentially dividing TS packets of the transport streams $TS_{-1}, \ldots, TS_{-N}$ synchronously supplied from the N input in the input order and outputting them in the predetermined order to the outputs. For example, TS packet division of N TS packets synchronously input at some time point is executed in the order of transport streams $TS_{-1}, \ldots, TS_{-N}$, and a series of N packets arranged in series in the division order is output. By sequentially repeating this synchronous operation, one time sequential transport stream TS0 is reproduced and output from the synthesizing circuit 127.

However, when TS packets are arranged in series in time, there is a possibility that the arrangement order of TS packets in the sub-channel information code series has an error. In the following, description will be made on detection and correction (re-arrangement) of an incorrect order of a TS packet. A TS packet after OFDM modulation has 188 bytes. The top 4-byte of the TS packet is a field called a header. Various packet control information is written in the header. More specifically, the header is constituted of an 8-bit "sync byte", a 1-bit "transport error representation", a 1-bit "payload unit start representation", a 1-bit "transport priority", a 13-bit "packet ID", a 2-bit "transport scramble control", a 2-bit "adaptation field control", and a 4-bit "continuity counter".

An adaptation field as the extended portion of packet control information, or a payload as actual transmission information, is constituted of 184 bytes excluding the header.

There are three types of the TS packet:
(1) A packet constituted of a header and a payload (adaptation field control information is [01]),
(2) A packet constituted of a header and an adaptation field (adaptation field control information is [10]), and
(3) A packet constituted of a header, an adaptation field and a payload (adaptation field control information is [11]).

Whether the TS packet has what structure (1)-(3) can be identified by the above-described 2-bit "adaptation field control information".

In the packets containing the payload, i.e., (1) and (3), the value of a continuity counter, i.e., the 4-bit cyclic counter in the header, is sequentially incremented. Therefore, if the adaptation field control information and the continuity counter value in the header are monitored, the packet order for reconfiguring a plurality of TS packets transmitted via sub-channels can be controlled. Namely, in reconfiguring TS packets, the packet structure is recognized from the adaptation field control information of the TS packet to be output next. If the TS packet has the structure (1) or (3), a TS packet is selected whose continuity counter value is larger by 1 than the current continuity counter value. If the TS packet has the structure (2), a TS packet is selected whose continuity counter value is equal to the current continuity counter value. Packets are reconfigured in this manner. A numeral in the TS packet shown in FIG. 10 indicates the continuity counter value. Although the detailed description is omitted herein, time axis compression of each sub-channel information code series in the packet unit can be realized easily by using a memory and establishing a packet sync by detecting a sync byte (8-bit sync unique word) written at the top of the packet header.

The transport stream TS0 integrated in this manner whose TS packets are reconfigured as necessary is output from each of the demodulation processing circuits $125_{-1}, \ldots, 125_{-N}$ to a corresponding one of the demodulation circuits $13_{-1}$ to $13_{-N}$ whereat high efficiency encoded code series (transport streams TS0) transmitted from a plurality of transmitters 1 are reproduced as video and audio signals. Information of the reproduced video and audio signals is displayed or output from monitors $1000_{-1}$ to $1000_{-N}$ as images and sounds.

If all the reception processing units $12_{-1}, 12_{-2}, \ldots, 12_{-N}$ output a transport stream, the number of N sub-channels constituting each transport stream is 1 and N sub-channel signals #1 to #N are wireless transmitted and received, and processed without division. This case is rather rare. Since the frequency band of each of the sub-channel signals #1 to #N is the unit for sending minimum information, a wireless transmission signal for a high resolution screen or the like is generally constituted of a plurality of sub-channel signals. In this case, attention should be paid to that monitors are not necessary to be connected to some reproduction channels.

The wireless transmission/reception system of the embodiment is constituted of several wireless transmitters (wireless cameras) 1 having the fundamental structure described previously and one (or a plurality of) wireless receiver 10 on the base station side described above. The features of the wireless transmission/reception system reside in that the number of transmission channels and the structure of transmission channels used can be changed flexibly. In connection to these features, description will be made on the structure, operation and operation example of a control of changing the transmitter 1 and wireless receiver 10.

The wireless receiver 10 on the base station side is provided with, as shown in FIG. 7, the above-described reception function and a transmission function of transmitting control information such as change information, i.e., corresponding to a transmission processing unit 15 and a transmission antenna (Ant.) 11B. The transmission processing unit 15 has a modulation circuit (Mod.) 151, a transmission frequency conversion circuit 152, a local oscillator circuit 153, and a transmission high frequency circuit (TXRF) 154. The transmission high frequency circuit 154 outputs control information after modulation which is wireless transmitted to the wireless camera 1 from the transmission antenna 11B.

On the side of the wireless camera 1, the reception processing unit 5 shown in FIG. 1 has a reception high frequency circuit (RXRF) 51, a reception frequency conversion circuit 52, a local oscillator circuit 53, and a demodulation circuit (Demod.) 54. The demodulation circuit 54 outputs control information after demodulation which is input to the control circuit 7.

In operation, an operator at the base station monitors the monitors $1000_{-1}$ to $1000_{-M}$ and selects videos and sounds having a high priority order to be actually transmitted as broadcasting waves. If this selection requires a change in the system, upon detection of the selection of the operator, the control circuit 14 operates to generate control information such as a transmission bandwidth and a transmission frequency for each wireless camera, in accordance with the selection of the operator. Control information S14 for each wireless camera generated by the control circuit 14 is modulated by a modulation circuit 151, and transmitted to each wireless camera via the transmission antenna 11B after passing through the transmission frequency conversion circuit 152 for frequency conversion by an oscillation signal from the transmission local oscillator circuit 153 and through the transmission high frequency circuit 154.

The transmitted control signal is captured by the antenna 4A shown in FIG. 1, passed via the diplexer 4B to the reception high frequency circuit 51 whereat it is amplified to a proper level. The control signal is then converted into a proper intermediate frequency by the reception frequency conversion circuit 52 for frequency conversion by an oscillation signal from the reception local oscillator circuit 53, and demodulated by the demodulation circuit 54. The control signal from the base station is input to the control circuit 7. The control circuit 7 extracts only a control signal pertaining to its control from the control signal, to thereby control the coding speed of the video coder circuit 32 and audio coder circuit 34 and control the division circuit 36 and transmission local oscillator circuit 40 to thus control the bandwidth. The transmission frequency may further be controlled by controlling the transmission high frequency circuit 41.

Figure 11A:
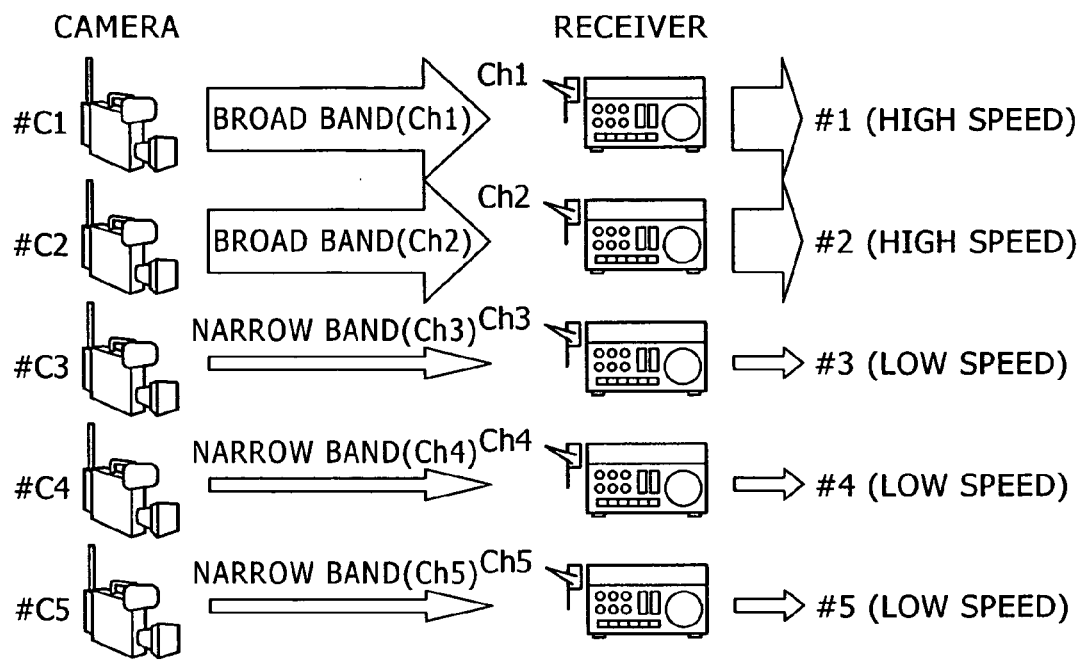
FIGS. 11A and 11B are diagrams showing examples of the arrangement of frequencies and bandwidths in the wireless transmission/reception system according to the embodiment, by operating five wireless cameras by way of example.
Figure 11B:
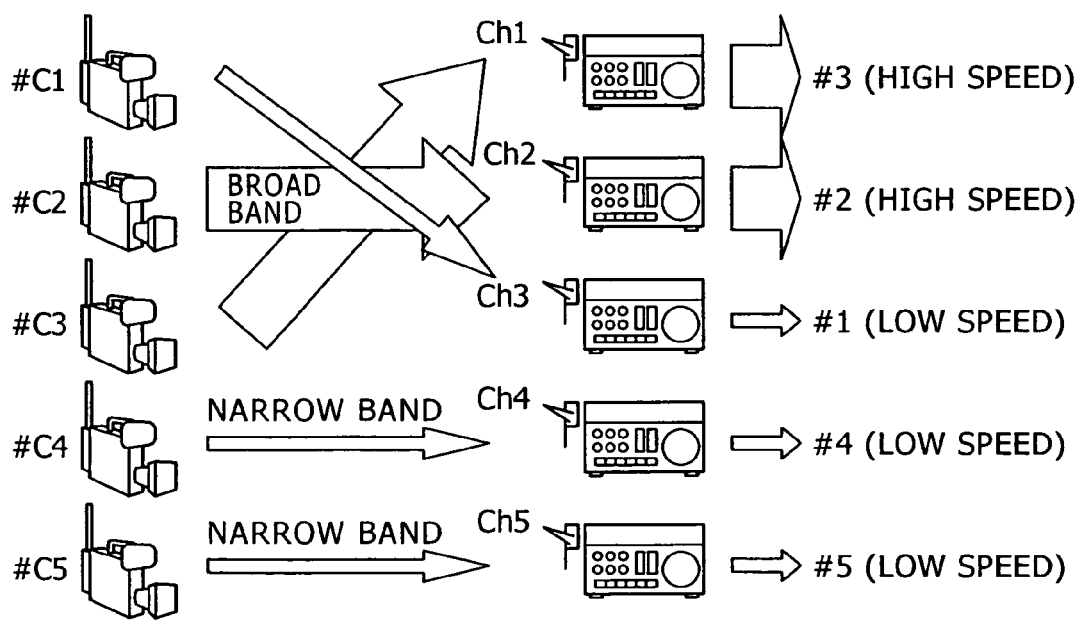
Figure 12:
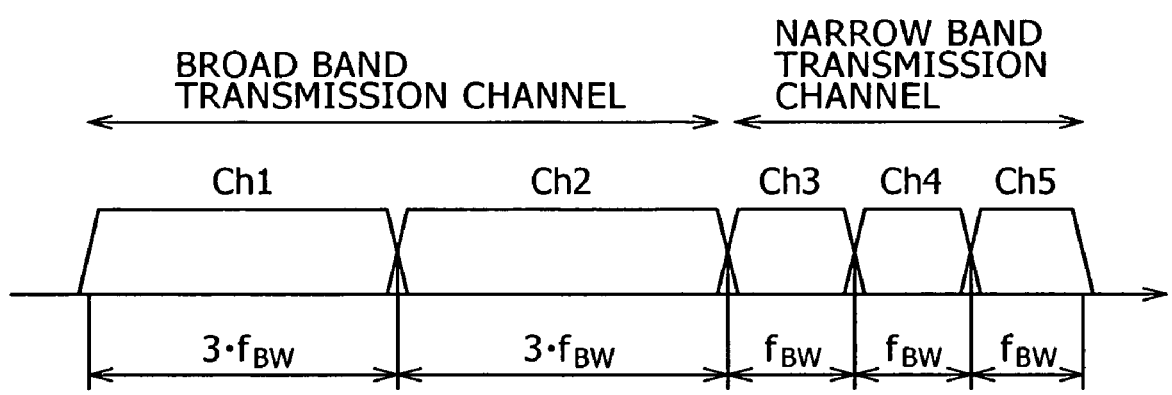
FIG. 12 is a diagram showing frequency band assignment to transmission channels during a normal operation (FIG. 11A).

FIGS. 11A and 11B show examples of the arrangement of frequencies and bandwidths in an illustrative case wherein five wireless cameras 1 (hereinafter represented by #C1, #C2, #C3, #C4 and #C5) are operated. FIG. 11A shows a usual operation state, and FIG. 11B shows a change example. FIG. 12 shows the assignment of frequency bands of transmission channels during usual operation.

As shown in FIG. 11A and FIG. 12, in this operation example, two broadband transmission channels Ch1 and Ch2 and three narrow transmission channels Ch3 to Ch5 are assigned in a usual case. In FIG. 12, a symbol $f_{BW}$ is a frequency bandwidth of one sub-channel constituted of K unit sub-carrier waves. Therefore, the frequency division number N is N=9 on both sides of the wireless camera 1 and wireless receiver 10. Three-division of the frequency band is set to the reception processing circuits $12_{-1}$ and $12_{-2}$ of the wireless receiver 10, and no division of the frequency band is set to the other reception circuits $12_{-3}$ to $12_{-5}$. Three-division of the information code series for an HDTV high transmission rate is set to the wireless cameras #C1 and #C2, and no division of the information code series for an SDTV low transmission rate is set to the other wireless cameras #C3 to #C5. In this example, all wireless cameras have the same structure and the wireless cameras #C3 to #C5 are also configured to be able to be changed from the setting for SDTV to that for HDTV.

The base station can monitor all videos and sounds sent from the five wireless cameras #C1, #C2, #C3, #C4 and #C5 so that an operator can determine, from the viewpoint of program production, which signal among the signals sent from the wireless cameras is given a priority. FIG. 1A corresponds to the case in which the operator determined to give a priority to the signals from the wireless cameras #C1 and #C2 from the viewpoint of program production, and the wireless cameras #C1 and #C2 with the priority are assigned broadband channels Ch1 and Ch2. One of videos shot with the wireless cameras #C1 and #C2 can be sent to a key station from the receiver at a high image quality, as the video to be used in the program.

FIG. 11B corresponds to the case in which the operator changes a wireless camera with a priority from the state shown in FIG. 1A to the state shown in FIG. 11B to assign the broadband channels Ch2 and Ch1 to the wireless cameras #C2 and #C3 because it is necessary to give a priority to the wireless cameras #C2 and #C3 from the viewpoint of program production. Since the wireless camera #C2 has the priority, it is not necessary to change its channel. Therefore, for example, if a signal from the wireless camera #C1 of the priority wireless cameras #C1 and #C2 in FIG. 11A is actually transmitted on air and a signal from the wireless camera #C2 is transmitted on air next, the operator can change the wireless camera immediately. However, if the broadband channel is switched not to the priority wireless camera but to the wireless camera #C3, #C4 or #C5 in FIG. 11A as in the case of FIG. 11B, it requires some switching time, from when the broadband channel Ch2 is assigned to the wireless camera to be next switched in place of the wireless camera #C1 in order to make high the quality of a signal after switching, to when the signal from a desired wireless camera can be received stably. However, in this embodiment, it is not necessarily required to assign the broadband channel currently used by a wireless camera temporarily to another wireless camera. In this embodiment, if there is a restriction that the broadband channel should use continuous frequency bands, the above-described switching operation is necessary. However, if this switching operation is not necessary, a desired frequency band can be selected because of the structures of the receiver and wireless camera of this embodiment. It is therefore possible to transmit one broadband video by using a plurality of discrete frequency bands. In this case, it is not necessary to make a channel temporarily idle for the switching operation, resulting in an advantage of easy operation.

A switching control method for the wireless camera and receiver can be applied also to the configuration whose transmitters and receivers use a plurality of N wireless transmission paths like the previously applied Patent Document 1, i.e., the configuration having N transmission antennas, N transmitters, N reception antennas and N receivers. In this case, each receiver is additionally provided with a function and structure for integrating N reception signals in an optional manner, in order to allow a desired assignment of transmission channels (correspondence between broadband or narrowband channels and wireless transmission channels). In addition, each transmitter is additionally provided with a function of dividing an information source into packets and transmitting them from a plurality of wireless transmission paths (capable of being selected and changed as desired) while quadrature is maintained and a function and structure for changing a transmission rate. In this case, if the original information source is the same, even if the transmission side transmits the original information source by distributing it to a plurality of frequency bands while the quadrature is maintained, in the form of respective wireless transmission signals, the reception side can reproduce and integrate the original information source if the correspondence between a received signal and the information source is known in advance as control information. To this end, the receiver is additionally provided with a function and structure for transmitting the control information for the transmission channel assignment and transmission rate change to the transmitter, and the transmitter is additionally provided with a control function and structure for changing distribution destinations of the information source and selections of wireless transmission paths in accordance with the received control information. Needless to say, operation frequencies, bandwidths and operation methods are not limited only to those examples described above.

The embodiment has the following several advantages.

The advantages of the wireless transmitter 1 are as follows. First, the control circuit 7 can change the transmission rate, e.g., a coding rate, of an information code series (transport stream TS0) in accordance with an input control signal, and in response to this change, the division number M of the transport stream TS0 can be changed as desired within the range of the maximum division number N or smaller. In this case, the control circuit 7 controls the frequencies f11 to f1N of local oscillation signals output from the transmission local oscillator circuits 40 to generate one integrated OFDM modulation signal #0. It is therefore possible to realize wireless communications in the frequency band suitable for the information amount of a transport stream to be transmitted. Second, the control circuit 7 can change the frequency of a wireless channel signal #0 in accordance with an input control signal. It is therefore possible among others to properly arrange wireless channel signals for a plurality of reception signals in a limited frequency bandwidth. Third, since the transmission signal with integrated frequency bands is an OFDM modulation signal which is transmitted by dispersing a broadband signal to relatively low frequency sub-carrier waves, multi-path resistance is high and an OFDM transmitter can be realized having a single transmission unit and a simple structure. The conditions of integrating transmission signals to one OFDM modulation signal are: (1) the coding factors of the N forward error correction encoding circuits 381 are the same; (2) the interleave parameters of the N interleave circuits are defined to be the same; (3) N IFFT circuits 383 operate synchronously; (4) the N guard interval adding circuits 384 are required to add the guard interval having a constant length at the same timing in the symbol; (5) to use the same symbol length; and (6) to execute a modulation process, particularly a quadrature modulation process, by using the same clock and generate a symbol by using the same clock. If these six conditions (1) to (6) are satisfied, one wireless channel signal becomes a complete one OFDM modulation signal. Even if some conditions are not satisfied, the wireless channel signal can be considered the OFDM modulation signal. Therefore, it is not essential that the six conditions are all satisfied. Fourth, if a plurality of transmitters are used, there is an advantage that a plurality of OFDM modulation signals having adjacent frequency bands maintain quadrature and interference does not exist.

Next, the advantages of the wireless receiver 10 will be described. First, the band separation circuits $122_{-1}$ to $122_{-N}$ separate the frequency band of a reception signal based on the frequency bandwidth of f0. Since the reception signal is an OFDM modulation signal, even if the separated reception signal has, as noise components, harmonics in the unit of the unit sub-carrier wave interval, the harmonics as the noise components in the unit sub-carrier wave adjacent to the separated reception signal are in the quadrature relation so that the reception signal is not influenced by the noise components. The noise components can be eliminated effectively by a later stage low-pass filter or the like. Second, a plurality of reception processing units $12_{-1}$ to $12_{-N}$ are provided, each being capable of extracting a signal in a different frequency band. More specifically, when a plurality of OFDM modulation signals each being a single wireless channel signal are received and input to the plurality of reception processing units 12-1 to 12-N, each reception processing unit can select signals after separation corresponding to a preset channel and synthesize them after modulation. In order to select these signals, the N local oscillator circuits 124 in total provided in each reception processing unit can perform the output control of stopping the output of any one of local oscillation signals f11 to f1N 2 identified by an input control signal, for the preset frequency band to be used by the channel. This output control controls in such as manner that all the frequency conversion circuits $123_{-1}$ to $123_{-N}$ of the N reception processing units $12_{-1}$ to $12_{-N}$ will not duplicately perform frequency conversion of a signal in the same frequency band. Since the frequency-converted signals are similar baseband signals or similar low frequency band IF signals, these signals can be demodulated and integrated in the same frequency band. The control circuit 14 performs this output control. Third, the frequency bandwidth and frequency band to be used can be set and changed arbitrarily in accordance with an information amount of a plurality of channels. More specifically, the transmission processing unit 15 and transmission antenna 11B are provided which are used for the control circuit 14 to transmit the control information S14 for instructing channel arrangement to the wireless transmitter 1. It is therefore possible to instruct a plurality of wireless transmitters 1 to generate transmission signals suitable for the newly set channel arrangement. In accordance with the new channel arrangement, the control circuit 14 supplies each local oscillator circuit 124 of the reception processing circuit with the control information representative of a combination of local oscillation signals f11 to f1N to be output and not to be output. Even if a plurality of signals are received from a plurality of wireless transmitters 1, signals after the division corresponding to the new channel arrangement can be selected for each reception signal. As a plurality of transmission signals for the new channel arrangement sent in response to the control signal are received, and signals after the division corresponding to the new channel arrangement are selected and integrated after modulation. Fourth, the N demodulation processing circuits $125_{-1}$ to $125_{-N}$ provided in each of the N reception processing units $12_{-1}$ to $12_{-N}$ have the same transmission path complex parameter and demodulation parameter so that uniform and stable processing is possible. Fifth, even if the order of packets is changed from some reason, the changed order can be corrected by referring to the adaptation field control information and continuity counter value of each TS packet.

In the wireless transmission/reception system of this embodiment, a plurality of wireless cameras as the wireless transmitter 1 are used, and the arrangement and combination of broadband and narrowband channel signals can be changed as desired which are output from respective output channels of the reception processing units $12_{-1}$ to $12_{-N}$ of the wireless receiver 10 for receiving wireless transmission signals from the plurality of wireless cameras. A wireless camera system capable of flexible operation can therefore be configured.

What is claimed is:

1. A wireless transmission/reception system, comprising:
  a plurality of wireless transmitters for generating an information code series from an input signal, modulating a carrier wave in accordance with said information code series, and transmitting said modulated wave as a wireless transmission signal from a transmission unit; and
  a wireless receiver for receiving and demodulating a plurality of wireless transmission signals transmitted from said plurality of wireless transmitters, and extracting said information code series corresponding to each of said wireless transmitters; wherein
  said wireless receiver includes a control circuit for generating a control signal which assigns a wireless frequency band and a transmission frequency to each of wireless transmission signals, and a transmission processing unit for transmitting said control signal to each of said wireless transmitters; and
  each of said plurality of wireless transmitters includes a reception processing unit for executing reception processing of said received control signal, and is configured to be able to change a wireless frequency band and a transmission frequency of a wireless transmission signal to be transmitted in accordance with said received control signal.

2. The wireless transmission/reception system, according to claim 1, wherein
  each of said plurality of wireless transmission signals is an OFDM modulation signal modulated using OFDM; and
  with said control signal, each wireless frequency band of each of said plurality of wireless transmission signals is defined in the unit of a unit sub-carrier wave group constituted of a plurality of OFDM unit sub-carrier waves having a constant frequency interval and each transmission frequency of said plurality of wireless transmission signals is defined so that all of unit sub-carrier wave groups of said plurality of wireless transmission signals form one OFDM modulation signal.

3. The wireless transmission/reception system, according to claim 2, wherein
said wireless receiver transmits said control signal generated by said control circuit for independently changing a transmission rate of said information code series generated by each of said plurality of wireless transmitters; and
said plurality of wireless transmitters change the number of said unit sub-carrier wave group constituting said wireless transmission signal to be transmitted in accordance with said changed transmission rate.

4. The wireless transmission/reception system, according to claim 2, wherein
said wireless receiver has a plurality of demodulation processing units, which are provided for each of a plurality of output channels, for receiving said one OFDM modulation signal sent from said plurality of wireless transmitters, executing quadrature modulation of said unit sub-carrier wave group in a particular frequency band, and extracting said information code series generated by any one of said plurality of wireless transmitter; wherein
each of said plurality of demodulation processing units changes a correspondence between said information code series to be output to a corresponding output channel and said wireless transmitter by changing said particular frequency band of said unit sub-carrier wave group to be subjected to quadrature demodulation and a center frequency of said particular frequency band in accordance with said control signal.

5. The wireless transmission/reception system, according to claim 2, wherein
said control circuit defines a wireless frequency band and a transmission frequency of each of said wireless transmission signals by said control signal so that a plurality of wireless transmission signals output from said plurality of wireless transmitter forms one OFDM modulation signal having a guard band several fold larger than intervals of said unit sub-carrier wave between said unit sub-carrier wave groups.

* * * * *